United States Patent
Mignard et al.

(10) Patent No.: US 6,332,976 B1
(45) Date of Patent: Dec. 25, 2001

(54) CATALYST CONTAINING PHOSPHOROUS AND A PROCESS HYDROTREATMENT OF PETROLEUM FEEDS USING THE CATALYST

(75) Inventors: Samuel Mignard, Chatou; Nathalie George-Marchal, Saint Genis Laval; Virginie Harle; Slavik Kasztelan, both of Rueil Malmaison, all of (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 0 days.

(21) Appl. No.: 09/310,105

(22) Filed: May 12, 1999

Related U.S. Application Data

(63) Continuation-in-part of application No. 08/967,919, filed on Nov. 12, 1997, now abandoned.

(30) Foreign Application Priority Data

Nov. 13, 1996 (FR) .................................................. 96 13797

(51) Int. Cl.⁷ .......................... C10G 45/08; C10G 45/62; B01J 21/04; B01J 23/652; B01J 27/14
(52) U.S. Cl. ............................ 208/217; 208/213; 208/244; 208/243; 502/211; 502/213; 502/305; 502/314; 502/321; 502/322; 502/325; 502/332
(58) Field of Search ........................... 502/211, 213, 502/305, 314, 321, 322, 332, 325; 208/217, 213, 244, 243

(56) References Cited

U.S. PATENT DOCUMENTS

| | | |
|---|---|---|
| 4,721,696 * | 1/1988 | Kidd .................................... 502/210 |
| 4,752,376 | 6/1988 | Pachano et al. ..................... 208/86 |
| 4,762,814 * | 8/1988 | Parrott et al. ....................... 502/211 |
| 4,895,816 * | 1/1990 | Gardner et al. ....................... 502/10 |
| 4,940,530 | 7/1990 | Kukes et al. ......................... 208/89 |
| 4,941,964 | 7/1990 | Dai et al. ......................... 208/216 PP |
| 5,484,756 * | 1/1996 | Isomae ............................... 502/314 |
| 5,498,586 | 3/1996 | Dai et al. ............................ 502/313 |

FOREIGN PATENT DOCUMENTS

| | | |
|---|---|---|
| 0338788 | 10/1989 | (EP) . |
| 0469675 | 2/1992 | (EP) . |
| 0526988 | 2/1993 | (EP) . |

* cited by examiner

*Primary Examiner*—Steven P. Griffin
*Assistant Examiner*—Christina Ildebrando
(74) *Attorney, Agent, or Firm*—Millen, White, Zelano & Branigan, P.C.

(57) ABSTRACT

The invention concerns an alumina based catalyst containing, expressed as the oxide content by weight, 2–10% by weight of cobalt oxide CoO, 10–30% by weight of molybdenum oxide $MoO_3$ and 4–10% of phosphorous oxide $P_2O_5$, with a BET surface area in the range 100–300 $m^2/g$, a crushing strength CSH of more than 1.4 MPa, and an average pore diameter in the range 8–11 nm, the pore volume of pores with diameter of more than 14 nm being less than 0.08 ml/g, or less than 22% of total pore volume, the volume of pores with a diameter of less than 8 nm being at most 0.05 ml/g, or less than 10% of total pore volume, the volume of pores with diameter less than 10 nm being in the range of 20%–70%, the volume of pores with diameter between 10 nm and 13 nm being in the range of 20%–60%, and the volume of pores with a diameter which is in the range 8 to 14 nm being in the range 0.20 ml/g to 0.8 ml/g.

The invention also concerns a hydrotreatment process using the catalyst, in particular hydrodesulphuration.

28 Claims, No Drawings

CATALYST CONTAINING PHOSPHOROUS AND A PROCESS HYDROTREATMENT OF PETROLEUM FEEDS USING THE CATALYST

CROSS-REFERENCE TO RELATED APPLICATION

This is a Continuation-In-Part of application Ser. No. 08/967,919, filed Nov. 12, 1997, now abandoned based on French application 96/13.797 filed Nov. 13, 1996.

BACKGROUND OF THE INVENTION

1. Field of the Invention

The present invention concerns a catalyst for hydrotreatment of a hydrocarbon petroleum feed, comprising cobalt, molybdenum and phosphorous.

Hydrotreatment of petroleum cuts is gaining importance in refining, both with the increasing necessity for converting ever heavier fractions and with the increasing severity of specifications for the finished products.

This state of affairs arises from the economic importance of maximally upgrading imported crudes with ever-increasing heavy fractions which have both a relative deficit of hydrogen in those heavy fractions or lighter fractions produced from them, and contain a large quantity of heteroatoms such as sulphur and nitrogen.

In general, hydrotreatment is the purification of hydrocarbon petroleum cuts without significant modification of the backbone defined by the carbon atoms. Thus it includes eliminating heteroatoms such as sulphur and nitrogen, eliminating metals, and partial or complete hydrogenation. When this proves to be necessary, the petroleum cut is hydrotreated then freed of the products formed which means that a purified petroleum cut can be recovered.

The "severity" of hydrotreatment is directly linked to the operating conditions. The term "operating conditions" means the nature of the feed, the total pressure in the reaction zone, the partial pressures of the various compounds, the reaction temperature, the hourly space velocity and the hydrogen flow rate. In general, the heavier the feed, the more difficult it is to convert, the more severe are the operating conditions, i.e., the pressures, temperature and hydrogen flow rate are higher and the hourly space velocity is lower.

2. Related Art

The closest known prior art is Sherwood, EP 0 526 988 A2. Sherwood describes the following catalyst:

1.6–6.0% wt GVIII metal oxide (NiO or CoO preferably NiO)
10.0–25.0% wt GVI metal oxide (Mo $O_3$ preferred)
1.0–6.0% wt $P_2O_5$, 1.5–3.0% preferred having
a surface of 160–210 $m^2/g$
Total Pore Volume (TPV) of 0.5–0.65 cc/g
diameters 100–130 Å: 70.0–85.0% TPV
>160 Å<7.5% TPV
>250 Å<4.0% TPV Sherwood has prepared CoMoP catalyst B (Table II of the Sherwood publication) with 3.3% Co., 15.2% $MoO_3$ and 1.5% $P_2O_5$ having a surface of, 182 $m^2/g$ and an average pore diameter of 120 Å and a TPV of 0.579 cc/g.

The following table summarizes the pore size distribution of Sherwood's catalysts, particularly CoMoP and NiMoP.

TABLE 1

Sherwood's Catalyst pore size distribution of Catalysts A and B.

| Pore Size (Å) | NiMoP (Ex. A) in % TPV | CoMoP (Ex. B) in % TPV |
|---|---|---|
| <100 | 12.8 | 11.2 |
| <130 | 90.1 | 85.4 |
| <160 | 94.2 | 96.2 |
| 100–130 | 78.1 | 74.2 |
| 100–160 | 81.4 | 85.0 |
| >120 | 43.7 | 50.2 |
| >130 | 9.2 | 14.6 |
| >160 | 5.9 | 3.8 |
| >250 | 3.9 | 2.2 |

SUMMARY OF THE INVENTION

Our research on a variety of supports with a variety of compositions has led us to the discovery that, surprisingly, alumina based catalyst containing, expressed as the oxide content by weight, 2–10% by weight of cobalt oxide CoO, 10–30% by weight of molybdenum oxide $MoO_3$ and 4–10% of phosphorous oxide $P_2O_5$ and which preferably has particular physico-chemical characteristics, has a hydrotreatment activity which is far superior to those of prior art formulations.

The matrix used is alumina based (at least 50% by weight of alumina) and is preferably essentially constituted by alumina.

The catalyst is characterized in that the phosphorous content, expressed as the percentage by weight of phosphorous pentoxide $P_2O_5$, with respect to the finished catalyst, is in the range 4.0% to 10.0%, preferably in the range 4.5% to 8.0% and more preferably in the range 5.6% to 8.0% or 5.6% to 6.5%. It is characterized in that the cobalt content, expressed as the percentage by weight of cobalt oxide CoO with respect to the finished catalyst, is in the range 2.0% to 10.0%, preferably in the range 3.5% to 7.0% and more preferably in the range 3.5% to 5.5%. It is characterized in that the molybdenum content, expressed as the percentage by weight of molybdenum oxide $MoO_3$ with respect to the finished catalyst, is in the range 10% to 30%, advantageously in the range 10% to 18.9%, preferably in the range 15.0% to 18.9% and more preferably in the range of 16.0% to 18.5%.

The catalyst is also characterized by:

BET Surface Area:
The BET surface area, measured on the finished catalyst, is in the range 100 to 300 $m^2/g$, preferably in the range 120 to 250 $m^2/g$ and more preferably in the range 130 to 240 $m^2/g$.

CSH:
The Shell crushing strength, termed CSH, measured on the finished catalyst, is more than 1.4 MPa and preferably more than 1.6 MPa.

Average Pore Diameter:
The average pore diameter is measured from the pore distribution profile obtained using a mercury porosimeter. From the pore distribution curve, the derivative curve can be calculated. This derivative curve passes through one or more maxima, the abscissa of which gives the pore diameter. The catalyst claimed is such that the maximum is/are obtained for a pore diameter or diameters in the range 80 Å to (10 Å=1 nm), preferably in the range 95 Å to 110 Å, more preferably in the 100 Å to 110 Å.

Pore Volume of Pores Below 80 Å:
The pore volume of pores with a diameter of less than 80 Å is at most 0.05 ml/g, or less than 10% Total Pore Volume (TPV), preferably at most 0.035 ml/g and more preferably at most 0.025 ml/g.

Pore Volume of Pores Over 140 Å:

The pore volume of pores with a diameter of over 140 Å is less than 0.08 ml/g, or less than 22% TPV, preferably less than 0.06 ml/g and more preferably less than 0.05 ml/g. There are practically no pores of over 250 Å, more generally their pore volume is less than 10% of the TPV, or more preferably less than 8%.

Pore Volume of Pores in the Range 80 Å to 140 Å:

The pore volume of pores with a diameter in the range 80 Å to 140 Å is in the range 0.20 ml/g to 0.80 ml/g, preferably in the range 0.30 ml/g to 0.70 ml/g and 20–60% of the total pore volume is in pores with a diameter 100–130 Å.

Table II below summarizes the pore size distribution of the catalyst of the present invention.

TABLE II

General pore size distribution of the catalyst of the present invention.

| Pore Size (Å) | % Total Pore Volume (TPV) | ml/g |
|---|---|---|
| <80 Å | <10% | ≦0.05 |
| <100 Å | 20–70% | |
| 80–100 Å | 20–60% | |
| 100–130 Å | 20–60% | |
| >140 Å | <22% | <0.08 |
| 80–140 Å | | 0.20–0.80 |
| >160 Å | <12% | |
| >250 Å | <10% | |

The catalyst of the present invention can be prepared using any one of the methods which are known to the skilled person.

The hydrogenating element is introduced during mixing or after forming (as is preferred).

Forming is followed by calcining, the hydrogenating element being introduced before or after calcining. Preparation is finished in all cases by calcining at a temperature of 250° C. to 600° C.

One preferred method consists of mixing a moist alumina gel for several tens of minutes then passing the paste obtained through a die to form extrudates with a diameter which is preferably in the range 0.4 to 4 mm.

The catalyst also comprises a hydrogenating function. The hydro-dehydrogenating function is provided by molybdenum or cobalt. It can be introduced into the catalyst at various stages in the preparation and in various ways.

It may be introduced partially or completely on mixing with the gel of the oxide selected as the matrix, the remaining hydrogenating element(s) being introduced after mixing, more generally after calcining.

Molybdenum is preferably introduced simultaneously with or after the cobalt, whatever the method of introduction.

It is preferably introduced by one or more ion exchange operations carried out on the calcined support using solutions containing the precursor salts of the metals.

It can be introduced by one or more operations for impregnating the formed and calcined support with a solution of one or more precursors of cobalt oxide while the molybdenum oxide precursor(s) is/are introduced prior to that during mixing of the support.

When the elements are introduced in several steps for impregnating the corresponding precursor salts, an intermediate calcining step must be carried out on the catalyst at a temperature which is in the range 250° C. to 600° C.

Phosphorous is introduced at any stage of the preparation. It can be introduced alone or mixed with cobalt and/or molybdenum. It can, for example, be introduced before peptising the alumina. It can also, for example, be introduced into the alumina extrudate with or without intermediate calcining. It can also be completely or partially introduced, mixed with the cobalt or the molybdenum, into the alumina which is in the form of an extrudate, with or without intermediate calcining. It can also be completely or partially introduced with the cobalt and molybdenum, into the alumina which is in the form of an extrudate, with or without intermediate calcining. It can also be introduced lastly and alone. Finally, it should be noted that this list is given by way of indication only and a large number of variations can be imagined.

Since these metallic elements are introduced in the form of oxides, in order to become active they have to be sulphurised. It should be noted that any in-situ or ex-situ sulphurisation method is suitable.

The invention also concerns a hydrotreatment process using this catalyst.

Many different feeds can be treated from naphtha (initial boiling point 80° C.) to vacuum distillates or vacuum residues.

The total pressure is in the range 0.5 to 20 MPa, the temperature is in the range 200° C. to 480° C., preferably in the range 260° to 450° C., the hourly velocity is in the range 20 to 0.05 $h^{-1}$ the hydrogen flow rate is in the range 100 to 3000 liters per liter of feed. The hydrogen partial pressure is preferably relatively low, at 0.5–6 MPa, preferably 0.5–5 MPa. To take two extremes as examples, hydrodesulphuration of a naphtha cut was carried out at a pressure of 1.5 MPa, a temperature of 300° C., an hourly space velocity of 10 $h^{-1}$ and a hydrogen flow rate of 100 l/l of feed while hydrodesulphuration of a deasphalted vacuum residue was carried out at a pressure of 20 MPa, a temperature of 390° C., an hourly space velocity of 0.5 $h^{-1}$ and hydrogen flow rate of 1500 l/l of feed.

The following examples illustrate the present invention without in any way limiting its scope.

We produced a large quantity of an alumina based support. To this end, we used a commercially available SB3 gel sold by Condea. The gel was mixed with water and nitric acid then mixed for 15 minutes. Following mixing, the paste obtained was passed through a cylindrical die to obtain extrudates with a diameter of 1.2 mm. The extrudates were then dried overnight at 120° C. then calcined at 550° C. for 2 hours in moist air containing 7.5% by volume of water.

EXAMPLE 1

Catalyst C1, not in Accordance with the Invention

Cobalt, molybdenum and phosphorous were added to the extruded support. The salts of these three elements were introduced simultaneously by dry impregnation of the support. The cobalt salt used was cobalt nitrate $Co(NO_3)_2$, $6H_2O$. The molybdenum salt was ammonium heptamolybdate $Mo_7O_{24}(NH_4)_6$, $4H_2O$ and the phosphorous was introduced in the form of $H_3PO_4$. After dry impregnation, the extrudates were dried overnight at 120° C. then calcined at 550° C. for two hours in moist air containing 7.5% by volume of water. The final quantities of metal oxides and the principal physico-chemical characteristics were thus as follows:

| | |
|---|---|
| MoO₃ (% by weight) | 18.2 |
| CoO (% by weight) | 4.1 |
| P₂O₅ (% by weight) | 1.9 |
| $S_{BET}$ (m²/g) | 205 |
| CSH (MPa) | 1.3 |

EXAMPLE 2

Catalyst C2, in Accordance with the Invention

Cobalt, molybdenum and phosphorous were added to the extruded support. The salts of these three elements were introduced simultaneously by dry impregnation of the support. The cobalt used was cobalt nitrate $Co(NO_3)_2$, $6H_2O$. The molybdenum salt was ammonium heptamolybdate $Mo_7O_{24}(NH_4)_6$, $4H_2O$ and the phosphorous was introduced the form of $H_3PO_4$. After dry impregnation, the extrudates were dried overnight at 120° C. then calcined at 550° C. for 2 hours in moist air containing 7.5% by volume of water. The final quantities of metal oxides and the principal physico-chemical characteristics were thus as follows:

| | |
|---|---|
| MoO₃ (% by weight) | 18.2 |
| CoO (% by weight) | 4.1 |
| P₂O₅ (% by weight) | 5.7 |
| $S_{BET}$ (m²/g) | 170 |
| CSH (MPa) | 1.8 |

Table III below shows the pore size distribution of catalyst C2.

TABLE III

Pore size distribution of catalyst C2

| Pore Size (Å) | % Total Pore Volume (TPV) | ml/g |
|---|---|---|
| <80 | 7.5 | 0.03 |
| 80–140 | 80.5 | 0.32 |
| >140 | 12 | 0.04 |
| <100 | 35 | |
| 100–130 | 57 | |
| >140 | 5 | |
| >250 | 2 | |

EXAMPLE 3

Catalyst C3, not in Accordance with the Invention, for Reference

Cobalt and molybdenum were added to the extruded support. The salts of these elements were introduced simultaneously by dry impregnation of the support. The cobalt salt used was cobalt nitrate $Co(NO_3)_2$, $6H_2O$, and the molybdenum salt was ammonium heptamolybdate $Mo_7O_{24}(NH_4)_6$, $4H_2O$. After dry impregnation, the extrudates were dried overnight at 120° C. then calcined at 550° C. for 2 hours in moist air containing 7.5% by volume of water. The final quantities of metal oxides and the principal physico-chemical characteristics were thus as follows:

| | |
|---|---|
| MoO₃ (% by weight) | 18.2 |
| CoO (% by weight) | 4.1 |
| P₂O₅ (% by weight) | 0 |
| $S_{BET}$ (m²/g) | 235 |
| CSH (MPa) | 1.2 |

EXAMPLE 4

Comparative Test: Hydrogenation of Toluene

The activity of the three catalysts described above were compared by hydrogenation of toluene. Before use, the catalysts were sulphurised in situ. The reaction was carried out at 3 MPa at a temperature of 300° C. The feed was constituted by toluene to which 2% by weight of DMDS had been added. The relative activities are shown in the table below. Catalyst C3, which contained no phosphorous, was selected as the reference.

| Catalyst | Activity |
|---|---|
| C1 | 126 |
| C2 | 152 |
| C3 | 100 |

It can be seen that the two catalysts containing phosphorous were more active than the catalyst with no phosphorous. Further, it can be seen that the catalyst which contained a high proportion of phosphorous was significantly more active than that containing only a little.

EXAMPLE 5

Comparative Test: HDS of SRGO

The three catalysts described above were compared using an actual feed. Before use, the catalysts were sulphurised in-situ. We measured the hydrodesulphurising activity on a straight run gas oil, the principal characteristics of which are given in the table below:

| | |
|---|---|
| Density at 15° C. | 0.856 |
| Refractive index at 20° C. | 1.4564 |
| Viscosity at 50° C. | 3.72 cSt = 3.72 × 10⁻⁶ m²/s |
| Sulphur | 1.57% by weight |
| Simulated distillation: | |
| IP | 153° C. |
| 5% | 222° C. |
| 50% | 315° C. |
| 95% | 415° C. |
| EP | 448° C. |

The HDS test on the gas oil was carried out under the following operating conditions:

| | |
|---|---|
| Total pressure | 3 MPa |
| Hourly space velocity | 2 h⁻¹ |
| Temperature | 310° C., 340° C. and 360° C. |
| Hydrogen flow rate | 250 l/l of feed |

The catalytic performances of the three catalysts at the three reaction temperatures are given in the following table.

They are expressed as the activity using the activity at each temperature of catalyst C3, which did not contain phosphorous, as the reference.

| Catalyst | 310° C. | 340° C. | 360° C. |
|---|---|---|---|
| C1 | 117 | 115 | 118 |
| C2 | 123 | 128 | 129 |
| C3 | 100 | 100 | 100 |

Catalyst C2 of the invention was apparently be significantly more active.

The catalyst of the invention is thus particularly suitable for hydrodesulphuration.

TABLE IV

Sherwood's pore size distribution versus the invention's pore size distribution.

| Pore Size (Å) | % of TPV of Sherwood Catalyst containing CoMoP | % of TPV ranges of the invention. |
|---|---|---|
| <100 | 11.2 | 20–70 |
| 100–130 | 74.2 | 20–60 |

Table IV shows a direct comparison between the pore size distribution of claim and that of the closest prior art's pore size distribution.

In comparing the properties of Sherwood's CoMoP catalyst in Table I above with the catalyst of the present invention in Table II above, there are notable differences. First, the majority of pores in Sherwood is in the range of 100–130Å, having an exemplified median pore diameter by volume of 120 and median pore diameter by surface area of 118, while the catalyst of the present invention has micropores that are higher in quantity, i.e. pores in the range of 80–100Å having a lower mean diameter of 80–110 Å. Second, as seen from Table IV, Sherwood's CoMoP catalyst has an exemplified TPV content of pores less than 100 Å of 11.2% whereas the catalyst of the present invention has a minimum percentage of almost twice that amount, i.e. 20–70%. Third, the global profile of the pores distribution of the present invention is more concentrated around the micropores, while in Sherwood the profile is more "spread" or distributed over the catalyst pores ranges.

A further notable difference between the properties of Sherwood's CoMoP catalyst and the present invention's catalyst C2 can be seen in that the deduced pore diameter of Sherwood's CoMoP catalyst of less than 100 Å is in the range of 11.2–12.8% TPV, whereas the C2 catalyst is 35% TPV.

For the convenience of comparison between the prior art disclosure, such as Sherwood's, Tables I, II, and III herein display pore sizes in term of percentage of Total Pore Volume (TPV) as well as its equivalence in ml/g where a comparison is likely to be made.

The preceding examples can be repeated with similar success by substituting the generically or specifically described reactants and/or operating conditions of this invention for those used in the preceding examples. Also, the preceding specific embodiments are to be construed as merely illustrative, and not limitative of the remainder of the disclosure in any way whatsoever.

The corresponding French application 96/13,797 of Nov. 13, 1996, is hereby incorporated by reference.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. An alumina catalyst containing, expressed as the oxide content by weight, at least 50% $Al_2O_3$, 2–10% by weight of cobalt oxide CoO, 10–30% by weight of molybdenum oxide $MoO_3$ and 4–10% of phosphorous oxide $P_2O_5$, with a BET surface area in the range 100–300 m²/g, a crushing strength CSH of more than 1.4 MPa, and an average pore diameter in the range 8–11 nm, and based on the total pore volume, the pore volume of pores with a diameter of more than 14 nm being less than 22%, the volume of pores with a diameter of less than 8 nm being less than 10%, the volume of pores with diameter less than 10 nm being in the range of 20%–70%, the volume of pores with diameter between 10 nm and 13 nm being in the range of 20%–60%, the volume of pores with a diameter which is in the range 8 to 14 nm being in the range 0.20 ml/g to 0.8 ml/g, with less than 0.08 ml/g having a pore size of greater than 140 Å, and with less than 10% of the pore volume having a pore size above 250 Å.

2. A catalyst according to claim 1, in which the $P_2O_5$ content is 4.5–8.0%.

3. A catalyst according to claim 2, in which the CoO content is 3.5–7.0% and the $MoO_3$ content is 10.0–18.9%.

4. A catalyst according to claim 1, in which the $P_2O_5$ content is 5.6–8.0%.

5. A catalyst according to claim 4, in which the CoO content is 3.5–7.0% and the $MoO_3$ content is 10.0–18.9%.

6. A catalyst according to claim 4, wherein the $P_2O_5$ content is 5.6–8.0% by weight.

7. A catalyst according to claim 4, wherein the $P_2O_5$ content is 5.6–6.5% by weight.

8. A catalyst according to claim 1, in which the CoO content is 3.5–7.0% and the $MoO_3$ content is 10.0–18.9%.

9. A catalyst according to claim 1, prepared by impregnating a calcined alumina based matrix with solution(s) of cobalt, molybdenum and phosphoric acid, followed by drying and calcining in moist air.

10. A catalyst according to claim 1, wherein the CoO content is 3.5–5% by weight.

11. A catalyst according to claim 1, wherein the $MoO_3$ content is 15.5–18.9% by weight.

12. A catalyst according to claim 1, wherein the $MoO_3$ content is 16.0–18.5% by weight.

13. A catalyst according to claim 1, wherein the $P_2O_5$ content is 5.6–6.5%, the CoO is 3.5–5% and the MoO content is 16.0–18.5%.

14. A catalyst according to claim 1, having a surface area in the range of 100 to less than 240 m²/g.

15. A catalyst according to claim 1, wherein the average pore diameter is in the range of 9.5 nm–11 nm.

16. A catalyst according to claim 1, wherein the average pore diameter is in the range of 10 nm–11 nm.

17. A catalyst according to claim 16, wherein the pore volume of pores having a diameter of less than 8 nm is at most 0.025 ml/g.

18. A catalyst according to claim 17, wherein the pore volume of pores over 14 nm is less than 0.05 ml/g.

19. A catalyst according to claim 1, wherein the pore volume of pores having a diameter of less nm 8 nm is at most 0.035 ml/g.

20. A catalyst according to claim 1, wherein the pore volume of pores over 14 nm is less than 0.06 ml/g.

21. A process for hydrotreatment of petroleum feeds comprising hydrotreating said petroleum feed in contact with a catalyst according to claim 1, operating at a temperature of 200–480° C., at a pressure of 0.5–20 MPa, with an hourly space velocity of 0.05–20 h$^{-1}$ and a hydrogen flow rate of 100–3000l/l of feed.

22. A process according to claim 21, carried out between 0.5 and 6 MPa.

23. A process according to claim 21, in which the hydrotreatment is hydrodesulphuration.

24. A process for hydrotreatment of petroleum feeds comprising hydrotreating said petroleum feed in contact with a catalyst according to claim 2, operating at a temperature of 200–480° C., at a pressure of 0.5–20 MPa, with an hourly space velocity of 0.05–20 h$^{-1}$ and a hydrogen flow rate of 100–3000l/l of feed.

25. A process for hydrotreatment of petroleum feeds comprising hydrotreating said petroleum feed in contact with a catalyst according to claim 4, operating at a temperature of 200–480° C., at a pressure of 0.5–20 MPa, with an hourly space velocity of 0.05–20 h$^{-1}$ and a hydrogen flow rate of 100–3000l/l of feed.

26. A process for hydrotreatment of petroleum feeds comprising hydrotreating said petroleum feed in contact with a catalyst according to claim 8, operating at a temperature of 200–480° C., at a pressure of 0.5–20 MPa, with an hourly space velocity of 0.05–20 h$^{-1}$ and a hydrogen flow rate of 100–3000l/l of feed.

27. A process for hydrotreatment of petroleum feeds comprising hydrotreating said petroleum feed in contact with a catalyst according to claim 3, operating at a temperature of 200–480° C., at a pressure of 0.5–20 MPa, with an hourly space velocity of 0.05–20 h$^{-1}$ and a hydrogen flow rate of 100–3000l/l of feed.

28. A process for hydrotreatment of petroleum feeds comprising hydrotreating said petroleum feed in contact with a catalyst according to claim 5, operating at a temperature of 200–480° C., at a pressure of 0.5–20 MPa, with an hourly space velocity of 0.05–20 h$^{-1}$ and a hydrogen flow rate of 100–3000l/l of feed.

* * * * *